July 29, 1958 W. F. SKILLIN 2,845,276
CHUCK
Filed May 23, 1955
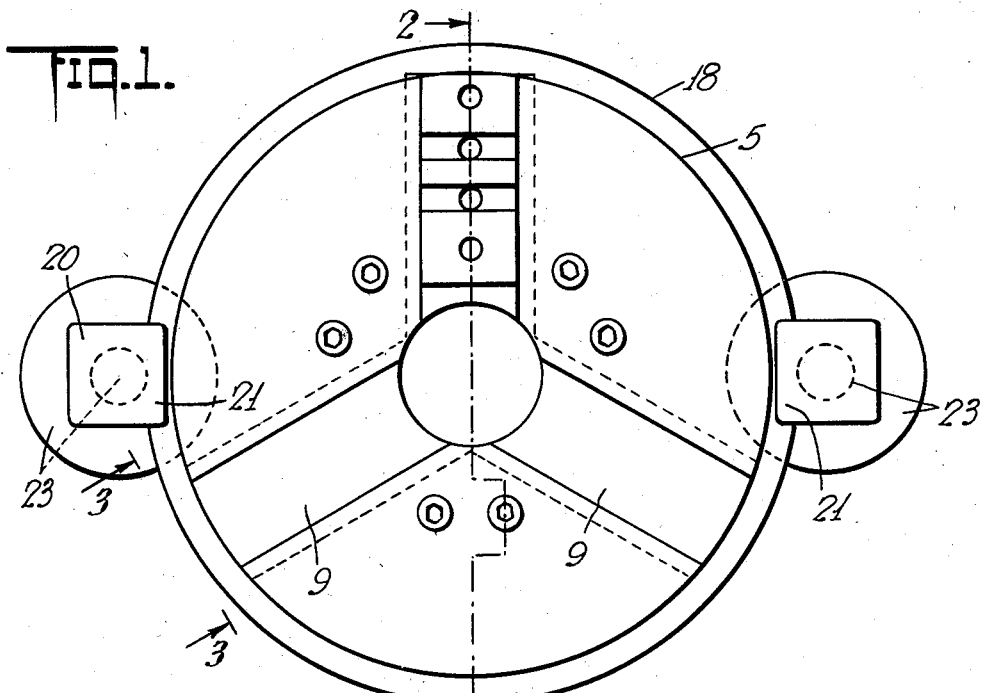
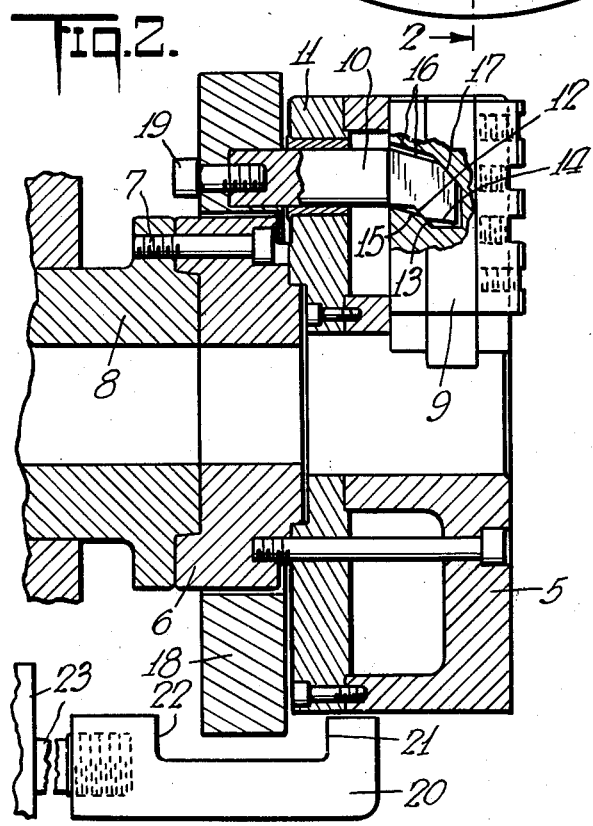
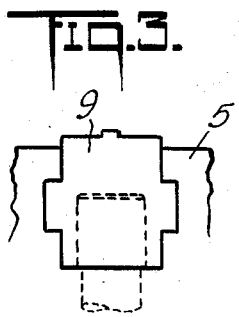
INVENTOR
Walter F. Skillin
BY
Mitchell Bechert
ATTORNEYS

United States Patent Office 2,845,276
Patented July 29, 1958

2,845,276

CHUCK

Walter F. Skillin, New Britain, Conn., assignor to Union Manufacturing Company, New Britain, Conn., a corporation of Connecticut Application May 23, 1955, Serial No. 510,124

11 Claims. (Cl. 279—121)

My invention relates to a chuck and, more particularly, to a simplified form of power chuck for producing desired chuck jaw movements.

It is a general object of the invention to provide a power chuck having improved means for actuating a jaw or jaws.

It is another object to provide a chuck having a jaw and means for producing both a jump and a feed movement for the jaw.

It is another object to provide an improved chuck and a chuck actuator having coacting means for actuating the chuck with a jump movement and a slow-speed feed and locking movement.

Still another object is to provide a chuck having a jaw or jaws together with wedging means at a locking angle for finally moving the jaws into chucking position and holding the same by said surfaces at a locking angle.

Other objects and various features of novelty and invention will be hereinafter pointed out or will become apparent to those skilled in the art.

In the drawings, which show, for illustrative purposes only, a preferred form of the invention:

Fig. 1 is a front view in elevation of a chuck illustrative of the invention;

Fig. 2 is a sectional view taken substantially in the plane of the line 2—2 of Fig. 1, showing the chuck stopped in a different position from that shown in Fig. 1; and Fig. 3 is a fragmentary view in elevation, taken substantially in the plane of the line 3—3 of Fig. 1.

Briefly stated, in a preferred form of the invention, I provide a chuck body having one or more movable jaws, in the present case provision being made for three such jaws. The jaws are movable in a radial direction and are moved by actuators, which in turn are moved in the actuating direction generally axially of the chuck body. These actuators may be carried by a ring or the like, which ring may be actuated by power means which might be fluid pressure actuated cylinder and piston means or the like. Each jaw and actuator have coacting wedging or camming surfaces so arranged that, upon generally axial movement of the actuator, the jaws will be cammed or wedged in the normal radial direction. These wedging or camming surfaces are preferably arranged so as to provide a jump movement for bringing the jaws up to position, and then a much slower feed movement for slowly moving the jaws onto the work and locking the jaws in final position.

In the preferred form illustrated, there is a chuck body 5 which may be secured, by an adapter 6 and screws 7 to a spindle 8. The chuck body 5 is provided with means for carrying one or more jaws—in this case three jaws such as at 9. The jaws 9 are arranged for radially guided sliding movement in the chuck body, as indicated particularly in Fig. 3. The jaws are moved in a radial direction by actuating means movable preferably in an axial direction. The jaw and actuator are provided with coacting jaw moving means, the means on at least one of said parts being a wedge or cam surface.

In the form illustrated, each jaw 9 has actuating means which may be in the form of a pilot actuator 10 piloted in the back plate 11 of the chuck, as clearly appears in Fig. 2. The chuck jaw and the pilot actuator 10 have coacting or wedging means for moving the jaw in a radial direction. In the form illustrated, the pilot actuator has a surface 12 for coaction with a corresponding surface 13 on the chuck jaw. These surfaces are at a sharp angle so that, when the pilot actuator 10 is moved axially toward the rear, the chuck jaw is jumped or rapidly moved in chucking direction. This movement is for jumping the chuck jaw up to the work. The actuator has a further cam surface or wedge surface 14 for later cooperation with the corresponding surface 15 on the chuck jaw so that these surfaces 14—15, which are at a very sticky or locking angle, give the jaw its final chucking movement onto the work. These surfaces 14—15, being at the sticky or locking angle, will then serve to hold the jaw in locked position on the chucked work piece. Movement of the pilot actuator 10 forwardly, that is, toward the right as shown in Fig. 2, will cause the wedge surfaces 16 on the jaw and the actuator 10 to break the locking hold of the jaw on the work, and further forward movement will cause the coacting wedging surfaces 17 on the actuator and the jaw to quickly traverse the jaw back to its fully retracted position.

In order to operate the actuator or actuators 10, I preferably provide a ring 18, which is positioned at the rear of the chuck and is movable axially of the chuck. In the form shown, this ring carries the pilot actuators 10, which are preferably secured in bores or apertures in the ring and held therein as by means of screws 19. Thus the ring 18 rotates with the chuck, but is capable of axial movement since it is guided and held by the slidable pilot actuators 10.

The actuators 10 preferably act in unison and for that purpose the ring 18, carrying the actuators, is actuated preferably by power means. In the form illustrated, the ring extends radially outwardly beyond the outer surface of the chuck and there is means such as a yoke 20 having one leg 21 for engagement with the top of the ring 18 and a second leg or surface 22 for engagement with the bottom or rear of the ring 18. This yoke 20 is preferably actuated by fluid pressure actuated means such as the piston and cylinder means 23. In order to secure perfect balance and symmetry, I prefer to employ two piston and cylinder means, as illustrated for actuating the ring 18 at diametrically opposite points.

It will be seen then that, when the yokes are moved rearwardly, the pilot actuators 10 will be moved rearwardly and the jump surfaces 12—13 will cause a jump of the jaws 9 up to the work to be chucked. Further rearward movement of the actuators 10 will cause the locking surfaces 14—15 to engage each other so as to more slowly urge the jaws into engagement with the work and, due to the locking angle of these surfaces 14—15, the jaws will be locked on the work during the operation on the work piece. This rearward movement, of course, is caused by the fingers or surfaces 21 on the yokes 20.

When the piece is to be unchucked, the fluid pressure actuated cylinder means 23 is moved forwardly or to the right to engage the legs or surfaces 22 with the rear sides of the ring 18, and the pilot actuators 10 will then be moved forwardly or to the right. This movement will cause the coacting surfaces 15 to break the lock of the jaws on the work, and further movement will cause the coacting surfaces 17 to quickly traverse the jaws 9 to wide-open or retracted positions.

It will be seen that I have provided a chuck which is very simple in construction and which will function equally as well as much more complicated chucks now in use. It will be noted that, for the sake of simplicity, I have shown the jaw 9 in a single piece and it will be understood that it will probably be necessary to form the jaw in several parts in order to easily and economically provide the various wedging surfaces heretofore mentioned.

While the invention has been described in considerable detail and a preferred form illustrated, it is to be understood that various changes may be made within the scope of the invention as defined in the appended claims.

I claim:

1. In a chuck, a chuck body, a plurality of chuck jaws movable radially on said body, an annular ring at the outside of and surrounding a part of the rear of said chuck body and movable axially relatively thereto, a pilot actuator for each of said jaws, said pilot actuators being secured to said ring and extending forwardly to said jaws, said pilot actuators and said jaws having coacting wedging surfaces for wedging said jaws radially upon generally axial movement of said actuators, and means for moving said annular ring and with it said actuators in a generally axial direction relatively to said chuck body.

2. In a chuck, a chuck body, a plurality of jaws movable radially on said body, an annular ring at the outside of and surrounding a part of the rear of said body and movable axially relatively thereto, a plurality of pilot actuators carried by said annular ring and piloted in said chuck body for carrying said annular ring with said body and permitting guided axial movement of said ring relatively to said body, said pilot actuators and said jaws having coacting wedging surfaces for wedging said jaws in a radial direction upon axial movement of said pilot actuators, and power means for moving said annular ring and with it said pilot actuators in an axial direction for wedging said jaws radially.

3. In a chuck, a chuck body, a chuck jaw movable radially thereon, a pilot actuator movable on said chuck body in a generally axial direction, said pilot actuator and said jaw having coacting sharp angle surfaces for quickly moving said jaw radially upon axial movement of said jaw actuator, said jaw and said pilot actuator having further angular coacting surfaces of locking angularity for moving said jaw relatively slowly and locking same upon further axial movement of said pilot actuator.

4. In a chuck, a chuck body, a chuck jaw movable radially thereon, a pilot actuator movable axially of said chuck body, said pilot actuator and said jaw having coacting wedging surfaces at sharp angles to produce a fast movement of said jaw and at slight angles to produce a feed and locking movement of said jaw upon a generally axial movement of said actuator.

5. In a chuck, a chuck body, a jaw movable thereon, a pilot actuator for said jaw, said pilot actuator and jaw having coacting means for moving said jaw by said pilot actuator first with a fast movement and then with a slow feed and locking movement, all during a uniform speed movement of said pilot actuator.

6. In a chuck, a chuck body, a chuck jaw member movable radially thereon, an actuator member for said chuck jaw and movable generally axially of said chuck body, one of said members having a sharp angle wedging surface and a low angle wedging surface, and the other of said members having a means to coact with said sharp angle and low angle wedging surfaces to wedge said jaw member radially on said body at a rapid rate and at a slow rate.

7. In a chuck, a chuck body, a chuck jaw member movable radially thereon, an actuator member for said chuck jaw and movable generally axially of said chuck body, one of said members having a low angle wedging surface and the other of said members having a sharp angle wedging surface, said members having surfaces to coact respectively with said low angle wedging surface and said sharp angle wedging surface.

8. In a chuck, a chuck body, a plurality of jaws movable radially on said body, axially movable chuck jaw moving means cooperable with said jaws for moving the latter radially upon movement of said chuck jaw moving means in an axial direction, said chuck jaw moving means having means extending rearwardly of said chuck body, an annular ring at the rear and outside of said chuck body and surrounding a part of the rear thereof, power means for moving said ring in an axial direction, said chuck jaw moving means cooperating with said ring for moving said chuck jaw moving means axially upon axial movement of said ring.

9. In the combination defined in claim 8, said jaw moving means and said ring being secured together so as to move together axially in both directions.

10. In the combination defined in claim 8, said chuck jaw moving means including plungers extending rearwardly through said chuck body.

11. In the combination defined in claim 8, said chuck jaw moving means being secured to said annular ring, said ring being rotatable with said chuck body.

References Cited in the file of this patent

UNITED STATES PATENTS

| | | |
|---|---|---|
| 1,786,147 | Bullard | Dec. 23, 1930 |
| 2,610,860 | Coan | Sept. 16, 1952 |

FOREIGN PATENTS

| | | |
|---|---|---|
| 184,335 | Great Britain | Aug. 17, 1922 |